(12) United States Patent
Guzik et al.

(10) Patent No.: US 7,295,002 B2
(45) Date of Patent: Nov. 13, 2007

(54) VACUUM CHUCK SPINSTAND FOR TESTING MAGNETIC HEADS AND DISKS

(75) Inventors: Nahum Guzik, Palo Alto, CA (US); Forest E. Ray, Redwood City, CA (US); Charles Brice Arnold, Newark, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 8 days.

(21) Appl. No.: 11/333,080

(22) Filed: Jan. 17, 2006

(65) Prior Publication Data

US 2007/0018640 A1 Jan. 25, 2007

Related U.S. Application Data

(60) Provisional application No. 60/651,562, filed on Feb. 10, 2005, provisional application No. 60/643,826, filed on Jan. 14, 2005.

(51) Int. Cl.
*G01R 33/12* (2006.01)
(52) U.S. Cl. ..................... 324/212; 324/261; 360/99.12
(58) Field of Classification Search ................ 324/210, 324/211, 212, 260, 261; 360/86, 98.08, 99.12; 720/706, 707; 346/137; 279/3
See application file for complete search history.

(56) References Cited

U.S. PATENT DOCUMENTS 2,444,531 A * 7/1948 Richardson ................. 451/388
4,958,839 A * 9/1990 Guzik et al. ................ 279/2.14
5,781,375 A * 7/1998 Honma ..................... 360/99.12
5,828,579 A * 10/1998 Beausang ...................... 716/2
5,872,451 A * 2/1999 Guzik ......................... 324/212
6,566,870 B2 * 5/2003 Sorenson et al. ........... 324/210
2003/0064004 A1 * 4/2003 Agren et al. .................. 422/64

* cited by examiner

*Primary Examiner*—Reena Aurora
*Assistant Examiner*—Kenneth J Whittington
(74) *Attorney, Agent, or Firm*—Mark G. Lappin; Foley & Lardner LLP

(57) ABSTRACT

A spinstand having a vacuum chuck clamping mechanism for securing magnetic discs includes a cap (9) and a base (10). A disk-to-be-clamped is held between the cap (9) and the base (10). Vacuum, applied through a port (4) in a mounting screw (12) of the base, provides the clamping force. The vacuum is held constant using a circumferential seal (27) on a piston (2) of the cap, which extends into a cylindrical countering bushing (3) extending from the base. In one form, the cap (9) is centered about a spin axis (SA) extending through the base (10), using a hardened pin (1) extending from the cap and a locating bushing (19) affixed to the base. When the cap (9) is inserted into the base (10), the pin (1) prevents a piston (2) in the cap from contacting the inside walls/sealing surface (11) of the centering bushing (3) of the base. To remove the cap, positive air pressure is applied to the air passage (4), collapsing the seal (27), and forcing the cap (9) out of the base (10) without causing wear on the seal (27) or the sealing surface (11) of the centering bushing (3).

20 Claims, 12 Drawing Sheets

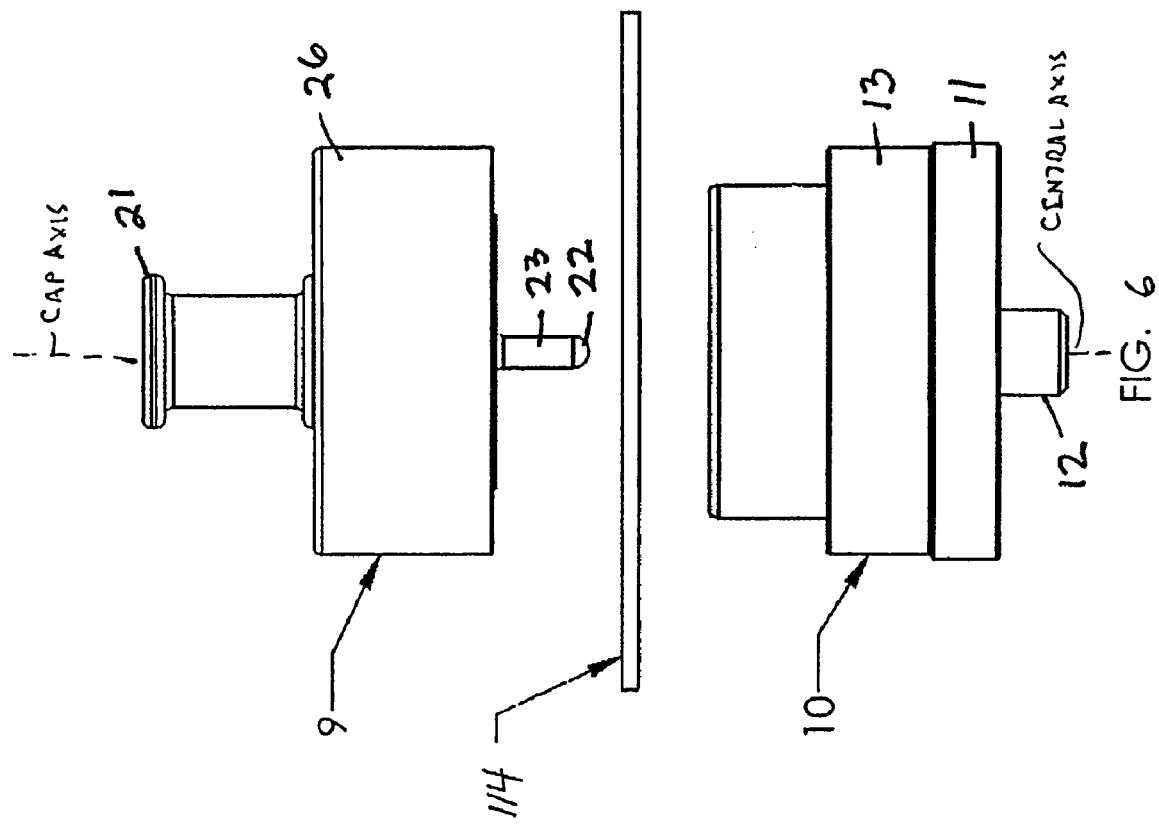
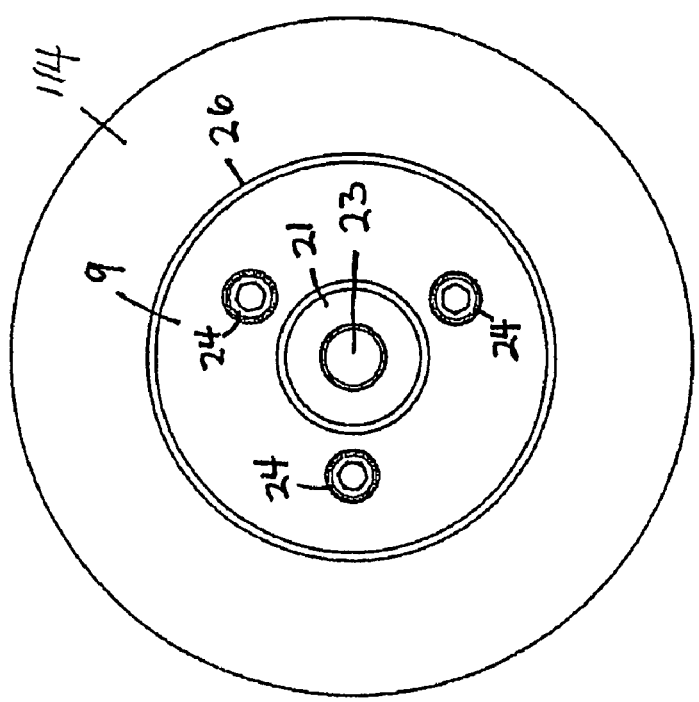

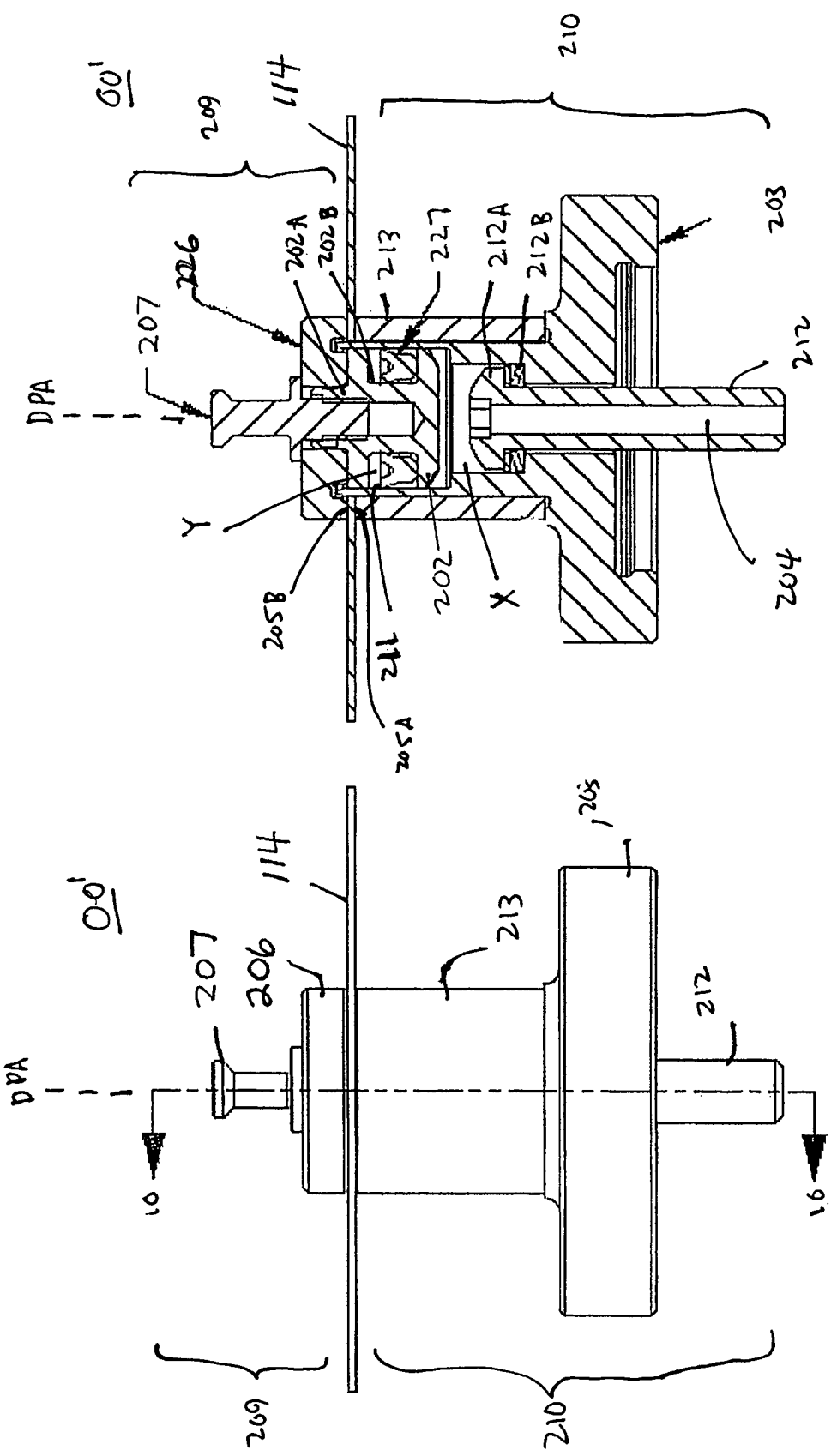

VACUUM CHUCK SPINSTAND FOR TESTING MAGNETIC HEADS AND DISKS

RELATED APPLICATIONS

The application claims priority to U.S. Provisional Patent Application Nos. 60/643,826, filed Jan. 14, 2005 and 60/651,562, filed Feb. 10, 2005.

FIELD OF THE DISCLOSURE

The present disclosure relates to spinstands and, in particular, to a vacuum chuck for securing disks mounted on and spun by a spindle of a spinstand.

BACKGROUND OF THE DISCLOSURE

A magnetic head and disk tester is an instrument that is used for testing the characteristics of magnetic heads and disks, such as a signal-to-noise ratio, track profile, etc. The tester should simulate those motions of the head with respect to the disk and the same rotational speeds of the disks that occur in an actual hard disk drive during operation. Each tester consists of two components, i.e., a mechanical component, commonly referred to as a spinstand, that performs movements of the head with respect to the disk, and an electronic component that is responsible for measurement, calculation, and analysis of the measured signal. The spinstand is also a mechanical component of a servo-writer, an instrument that is used for writing servo information on a magnetic disk, as well as a component of a flying height tester; an instrument used for measuring the flying height of a head over the disk.

An example of a prior art spinstand for a head and disk tester is illustrated in FIG. 1 (front view) and FIG. 1 (top view). The spinstand includes a stationary base plate 110 that supports walls 112a, 112b, 112c. The walls 112a, 112b, 112c in turn support a spindle 113 for carrying a disk pack DP disposed in a cylindrical disk pack region including one or more magnetic disks 114, having diameter D, and being coaxial about a disk pack axis DPA. The spindle 113 and the disks 114 are rotated by a spindle motor 115 about a spin axis SA.

The base plate 110 further supports first and second slide motors (not shown). The first slide motor moves a slide 116 along rails 117a, 117b in the Y direction (see FIG. 12). Two additional rails, 118a, 118b, are mounted on top of slide 116. The second slide motor controls movement of a second slide 19 along rails 118a, 118b in the X direction. The first and second motors cooperate to position a rotary positioner 120 mounted on slide 119 to a specified location with respect to the center of spindle 113. Rotary positioner 120 carries and positions magnetic head(s) 122 relative to disk(s) 114.

Another example of prior art spinstands for a head and disk tester include the Guzik V2002 XY-positioning spinstand and the Guzik S-1701B Micro Positioning Spinstand, both of which are available from the assignee of the present disclosure, Guzik Technical Enterprises, 2443 Wyandotte Street, Mountain View, Calif. 94043, USA (www.guzik.com).

As the density of magnetic recording increases, additional information tracks are compressed into a given disk area. The decrease in track size heightens the demand for improved accuracy in head positioning. Likewise, the rotational speeds of the magnetic disks increase in order to achieve shorter access times. In addition, more disks are added to the disk stack to provide additional storage.

As the disk(s) rotate, vibrations in both the disks and the magnetic heads may be induced. These vibrations increase track misregistration. In some cases, track misregistration reaches unacceptable levels at which spinstand operation becomes unreliable.

As described in U.S. Pat. No. 4,958,839, a prior art solution to this problem by Guzik Technical Enterprises is a ball-type clamping mechanism for clamping computer hard disks in a disk tester for accurate measuring of the disk's parameters comprises a cup-shaped support which is installed on a rotating part of the tester and serves to support a computer hard disk which rests on the upper surface of the support. The support has a cylindrical opening with a diameter equal to or slightly greater than the diameter of the disk opening. Slidingly inserted into the support is a cylindrical retainer which carries clamping balls uniformly spaced from each other in a circumferential direction and located in recesses formed in the side wall of the retainer. The balls have a diameter larger than the side wall of the retainer. A pull rod passes through the central opening in the bottom wall of the support and carries a clamping cone which is made from a resilient material softer than the material of the balls. When the rod is pulled down, a conical surface of the clamping cone pushes the balls radially outwardly into contact with the inner periphery of the hard disk, so that the disk is clamped. The number of balls exceeds three, so that a uniform clamping force is provided on each of the balls. Because the cone is made from a resilient material, the balls clamp the disk with a uniform force without the necessity of manufacturing the parts with accurate tolerances. This method allows quick replacement of a disk, but it can still distort the disk due to the discreet number of clamping points. Furthermore, the overall clamping force is limited, potentially resulting in instability.

A more common prior art solution, that securely holds the disk with adequate force, is a chuck consisting of a cap assembly and a base assembly. The cap and base assemblies clamp the disk to the spindle by use of a screw that passes through the cap and threads into the base. The screw attaches the cap to the base, clamping the disk with a force proportional to the fastening torque of the screw. This method is superior for head testing, headstack testing, and any other use that does not require frequent changing of the disk. However, this method creates problems for testing where the disk must be replaced repeatedly. The force is dependant upon the fastening torque, which can vary from one assembly to another, and the screw must be manually inserted and removed with each disk change, adding significant time to the process. Using a screw to hold the cap against the disk also makes automation of chuck insertion and removal difficult.

What is still desired is a new and improved apparatus and method for securing disks on a spindle of a spinstand. Among other aspects and advantages, the new and improved apparatus and method of the invention reduces vibration and track misregistration while decreasing overall testing times by clamping the disk without a mechanical fastener, decreasing operating times and allowing for the possibility of disk clamping automation. In addition, the new and improved apparatus and method preferably consistently and quickly secures a disk to a spindle of a spinstand with a known and repeatable clamping force, without adding additional unbalance to the system.

SUMMARY OF THE DISCLOSURE

The present disclosure is directed to an apparatus and method which mitigates the aforementioned prior art limitations. According to one exemplary embodiment of the present disclosure, the apparatus comprises a vacuum chuck that uses a vacuum to consistently and quickly secure a disk to a spindle of a spinstand with a known and repeatable clamping force. The present disclosure provides a method for quickly removing the disk from the spindle by reversing the air pressure from a vacuum to a pressure greater than atmospheric pressure, ejecting the cap assembly. The present disclosure also provides a method for quickly and accurately centering the removable portion of the chuck about the axis of spindle rotation using an internal centering pin and locating hole.

In accordance with the invention, a spinstand is provided for rotatably supporting a disk pack, where the disk pack includes one or more annular magnetic disks concentrically arranged in a stack along a disk pack axis (DPA), and the disks are mutually spaced apart in the direction of said DPA.

The spinstand included a base unit, a spindle and a vacuum chuck assembly. The spindle is coupled to the base unit and has an output drive element adjacent to a disk pack region and has an associated spindle drive motor. The spindle is adapted to selectively rotate the output drive element about a spindle axis which extends through the disk pack region.

The vacuum chuck assembly is coupled to the output drive element for removably positioning the pack in the disk pack region so that said DPA is coaxial with the spin axis in response to a selectively applied vacuum.

The vacuum chuck assembly includes a base assembly and a cap assembly. The base assembly is disposed along a central axis and is adapted for coupling to the spindle output drive element. The base assembly includes a centering bushing, a vacuum port and a lower disk support surface. The centering bushing has a cylindrical inner wall with a diameter D which is coaxial with and extends along the central axis, defining a base interior region. The vacuum port is adapted to fluidically couple an applied vacuum to the base interior region. The lower disk support surface extends transverse to the central axis and is adapted for engagement with one end of the disk pack.

The cap assembly is disposed along a cap axis and includes an inverted cup-shaped element, a piston, a circular seal and an upper disk support surface. The inverted cup-shaped element extends along the axis and is disposable opposite the base assembly with the cap axis being coaxial with the central axis. The piston extends from the cup-shaped element along the cap axis. The piston has a cylindrical lateral surface with a diameter less than D. The lateral surface includes a circumferential groove extending thereabout, transverse to the cap axis. The circular seal is disposed in the groove of the piston, defining a cap interior region between the seal and the cup-shaped element. The upper disk support surface extends transverse to the cap axis and is adapted for engagement with one end of the disk pack.

With a disk pack positioned on the lower disk support surface with the DPA being coaxial with the central axis, and with the cap assembly positioned opposite the base assembly with the cap axis coaxial with the central axis, a vacuum applied to the vacuum port causes the circular seal to pneumatically seal the base interior region with respect to the cap interior region. As a result, the vacuum causes a pressure differential across the piston, thereby biasing the piston toward the base assembly, and compressively supporting the disk pack between the lower disk support surface and the upper disk support surface.

In one form of the invention, the upper disk support surface and the lower disk support surface are relatively compliant compared to the disk pack.

In one form of the invention, the cap assembly includes a central pin extending along the cap axis from the cup-shaped element to a distal tip thereof so that the base assembly includes a locating element defining a locating hole. The locating hole is coaxial with an transverse to the central axis and is adapted to receive the distal tip of the centering pin. preferably the central pin has a soft distal tip, and preferably, the circular seal is a U-cup seal. The outer shell of the cap is preferably plastic, and mot preferably is 30% carbon filled PEEK.

In one form, the base unit is adapted to spindle is positioned with the output drive element facing away from the base unit. In another form, the spinstand includes a support structure for supporting the spindle whereby the output drive element faces the base unit, and the disk pack region is between the output drive element and the base unit.

In accordance one aspect of the invention, the above describe vacuum chuck is the invention, which may be used with the inventive spinstands described herein, or with conventional spinstands.

BRIEF DESCRIPTION OF THE DRAWINGS

The foregoing and other objects, features and advantages of the present disclosure will be apparent from the more particular description of exemplary embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 5 is a top plan view of the vacuum chuck and the disk of FIG. 3;

FIG. 6 is a side elevation view of the vacuum chuck of FIG. 3, wherein a cap of the chuck is shown separated from a base of the chuck to release the disk;

FIG. 9 is a side elevation view of another exemplary embodiment of a vacuum chuck constructed in accordance with the present disclosure, shown holding a disk;

FIG. 10 is a sectional view of the vacuum chuck and the disk taken along line 10-10 in FIG. 9;

DETAILED DESCRIPTION OF EXEMPLARY EMBODIMENTS

Figure 1:
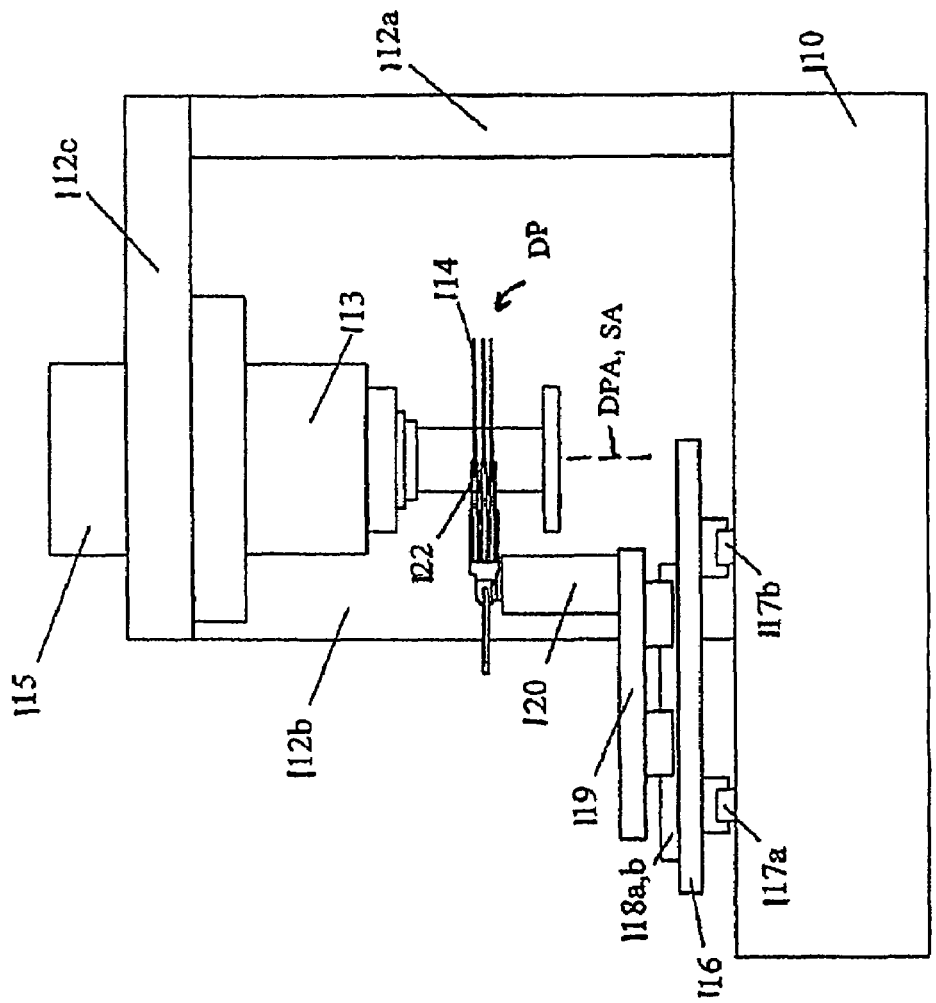
FIG. 1 is a schematic front view of a prior art spinstand.

Referring first to FIGS. 3-8, there is shown an exemplary embodiment of a vacuum chuck 00 constructed in accordance with the present invention for use with a spinstand. The chuck 00 is adapted to use an applied vacuum to consistently and quickly secure a magnetic disk 114 to a spindle with a known and repeatable clamping force. The disk 114 is secured between a lower disk support surface SA and cap assembly 9 and an upper disk support surface SB base assembly 10 of the vacuum chuck. A handle 21 extends from cap assembly 9. Preferably, there is no mechanical fastener connecting the cap assembly 9 to the base assembly 10.

The exemplary disk 114 is an annular structure with a central hole about a disk pack axis (DPA) and includes a fragile magnetic medium on one or both of the principal top and bottom surfaces. Typically, such disks are formed from a relatively hard material, such as glass. Although only a single disk 114 is shown in FIGS. 3-8, the "disk" may be in the form of a "disk pack" including more than one disk concentrically arranged along a disk pack axis (DPA) where the disks are mutually spaced apart.

In the illustrated embodiment, the vacuum chuck 00, a disk-to-be-clamped is held between the cap 9 and the base 10. The base 10 includes a threaded hallow mounting screw 12 extending therefrom, and adapting be base 10 to be threaded into a mating hold in the top surface of a spindle of a spinstand, which is adapted to be rotatably driven about a spin axis (SA) of the spinstand. The threaded interconnection of the base 10 and the spindle thus couple the chuck 00 to the spinstand.

The base 10 includes a centering bushing having a cylindrical extension defining a cylindrical inner wall 11 extending about the DPA. The base 10 also includes a locating bushing 19, and associated inverted cup-shaped support structure 19A, which positions a circular alignment hole to be coaxial with the DPA. The support structure includes a plurality of radially extending ports 19B, which establish fluidic coupling between region X interior to the structure 19A and region Y external thereto. The base 10 also includes a cylindrical spacer 13 disposed about the cylindrical extending portion of centering bushing 3, where the uppermost surface of spacer 13 forms upper support surface SA.

The cap assembly 10 includes an inverted cap-shell 26 disposed about a hollow position 2, and associated support structure 2A, which is affixed to the cap-shell 26 by way of screws 24. A handle 7 having an axially extending hollow central region extends from the top of support structure 2A. In the illustrated embodiment, a centering pin 1 extends into the hollow region of handle 7 and support structure 2A, and is sealingly affixed thereto. The hollow central region of piston 2 is disposed about region Y. The piston 2 includes a circumferential groove 2B which houses a circumferential seal 27. It is preferred that seal 27 is a U-cup seal, to support function a described more fully below. The seal 27 provides a selectively sealed interface between region X and region Y depending on the pneumatic pressure established in port 4.

Vacuum, applied through a port 4 in threaded mounting screw 12 of the base 10, provides the clamping force. The vacuum is held constant using a circumferential seal 27 on a piston 2 of the cap, which extends into a cylindrical countering bushing 3 extending from the base. In one form, the cap 9 is centered about a spin axis (SA) extending through the base 10, using a hardened pin 1 extending from the cap and a locating (or pin guide) bushing 19 affixed to the base. When the cap 9 is inserted into the base 10, the pin 1 prevents a piston 2 in the cap from contacting the inside walls/sealing surface 11 of the centering bushing 3 of the base. To remove the cap, positive air pressure is applied to the air passage 4, collapsing the seal 27, and forcing the cap 9 out of the base 10 without causing wear on the seal 27 or the sealing surface 11 of the centering bushing 3.

Figure 4:
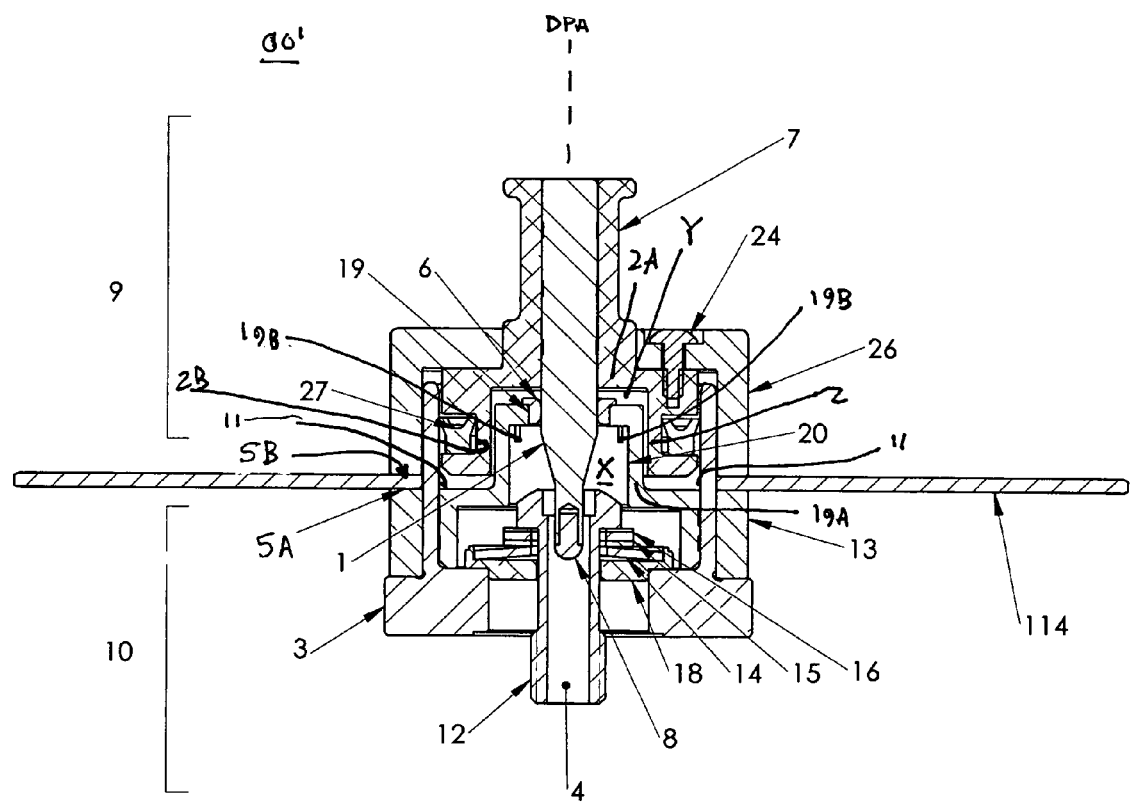
FIG. 4 is a sectional view of the vacuum chuck and the disk taken along line 4-4 in FIG. 3.
Figure 8:
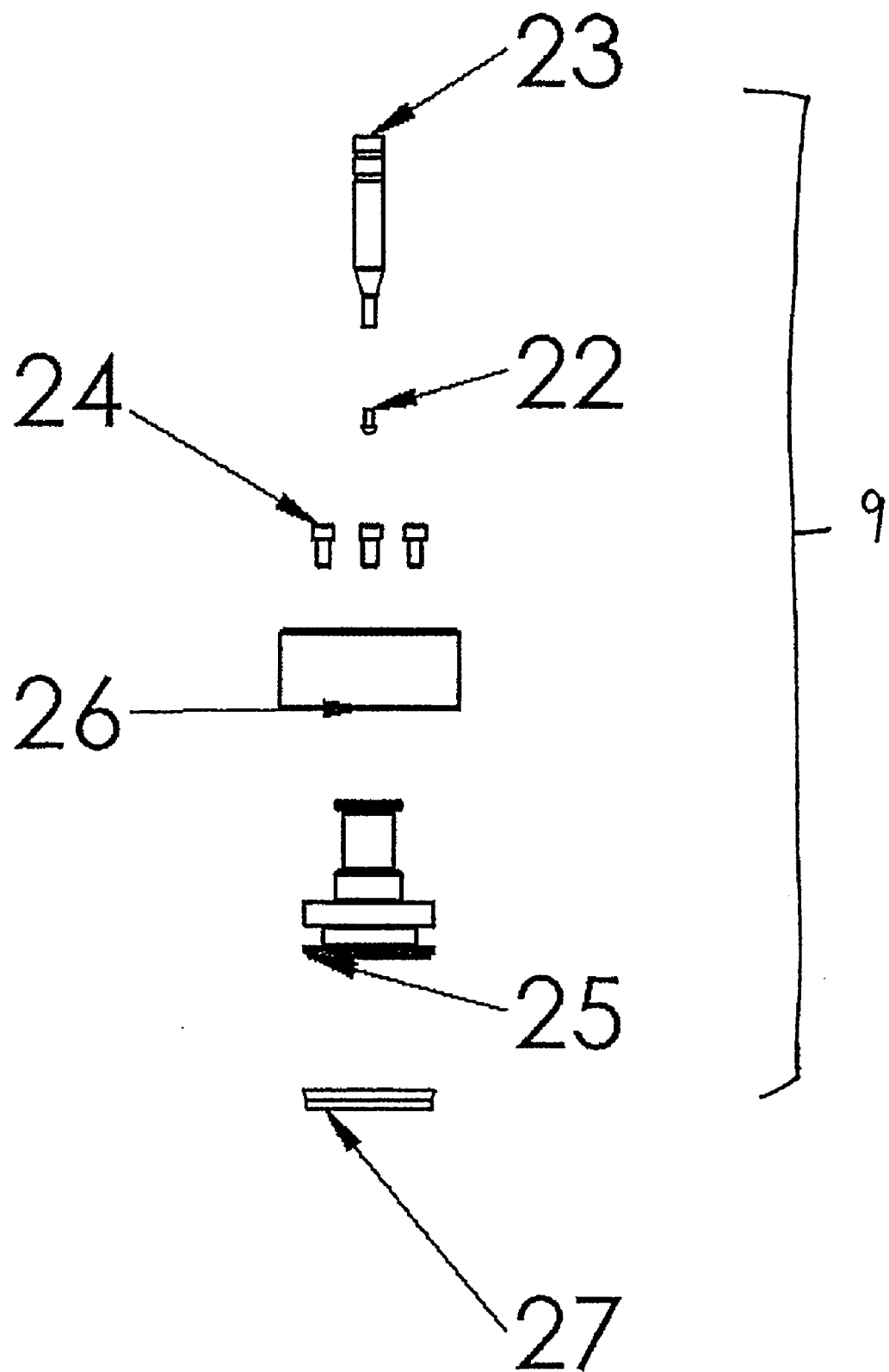
FIG. 8 is an exploded side elevation view of the cap of the vacuum chuck of FIG. 3.
Figure 11:
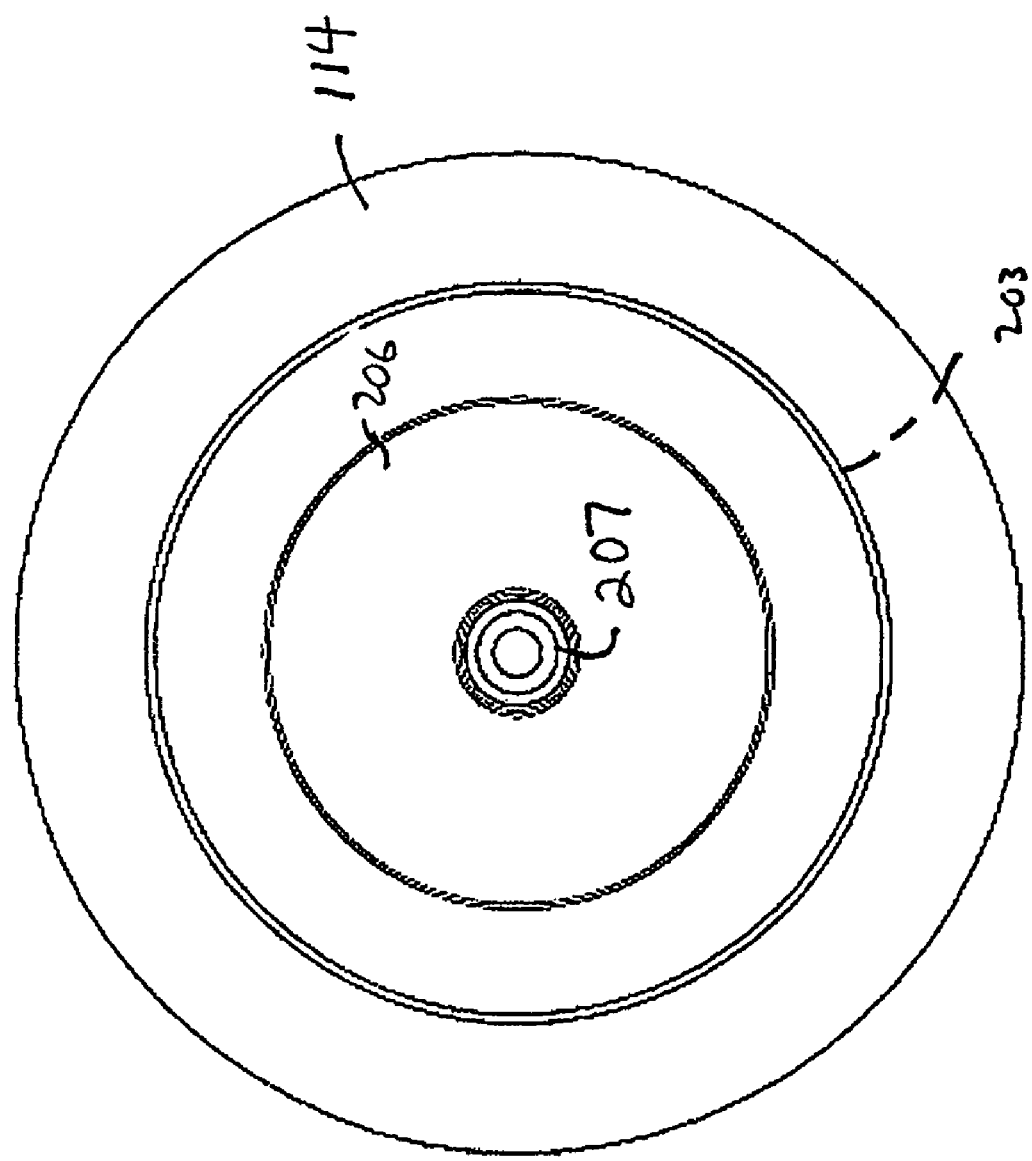
FIG. 11 is a top plan view of the vacuum chuck and the disk of FIG. 9.
Figure 12:
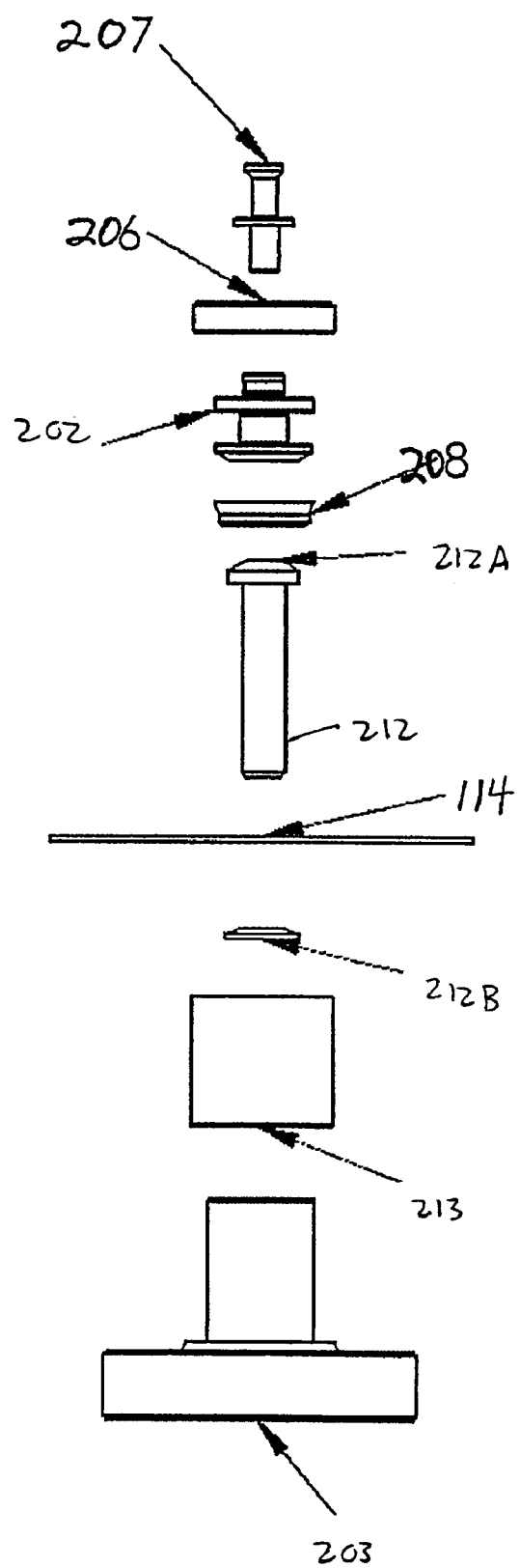
FIG. 12 is an exploded side elevation view of the vacuum chuck and the disk of FIG. 9.

Referring to FIGS. 4 and 8, the cap assembly 9 includes a centering pin 1 with soft tip 8, a U-Cup seal/piston assembly 2, an upper disk clamping surface 5, and a handle 7. U-Cup seal and piston assembly 2 is attached to cap 26 by screws 24, allowing disassembly of the cap for easy replacement of U-Cup seal 27 as desired. Centering pin 1 minimizing unbalance during operation by constraining cap assembly 9 radially to base assembly 10 without impeding insertion or removal of cap assembly 9. The soft tip 8 provides a surface that does not damage sensitive components upon accidental impact when the cap assembly 9 is inserted into the base assembly 10. The handle 7 further prevents possible damage during removal and insertion by keeping an operator's fingers away from the disk 114. Piston 2 and U-Cup seal 27 allow a consistent vacuum to be held between the cap 9 and base 10, while also collapsing under positive pressure as might be applied via part 4 inside the cap and base assembly, allowing the cap to be removed quickly and without excess wear to seal 27 or inner wall 11 of centering bushing 3 of base 10. Preferably cap-shell 26 is made from a material softer than that of the disk 114, such as a rigid plastic with static dissipative properties, to avoid damaging the disk surface.

Figure 7:
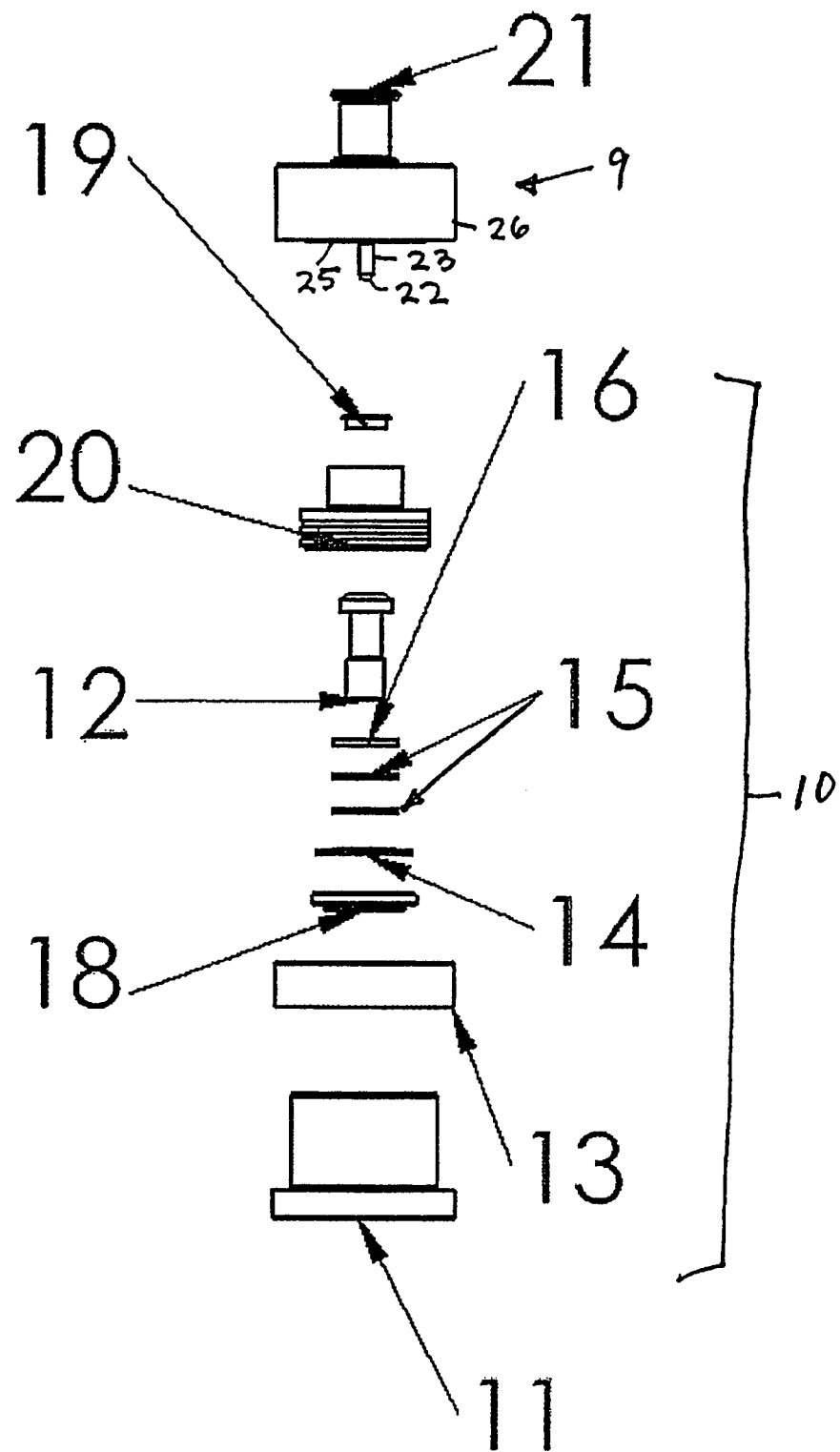
FIG. 7 is a side elevation view of the vacuum chuck of FIG. 3, wherein the cap of the chuck is shown separated from the base of the chuck, and the base is shown exploded.

Referring to FIGS. 4 and 7, the base assembly 10 includes a locating hole 6 in pin guide bushing 19 for allowing passage of the centering pin 1 as the cap assembly 9 is attached to base assembly 10. As a vacuum is applied (via a channel in the spinstand spindle in the illustrated embodiment) through the air passage 4, cap assembly 9 is pulled against the base assembly 10 to secure the disk 114 between surfaces 5A and 5B. The centering pin 1 centers the cap assembly 9 on the base assembly 10 to minimize unbalance, as the vacuum chuck rotates in use. Centering the cap assembly 9 on the base assembly 10 using a small diameter internal pin and locating hole such as pin 1 and hole 6 provides relatively easy insertion and removal, compared to use of an external centering location, such as the outer diameter of a centering bushing 3 of the base assembly 10 and the inner diameter of the upper disk clamping surface 5 of the cap assembly 9. Centering pin 1 also prevents piston assembly 2 from contacting the inner wall 11 of centering bushing 3, eliminating wear on non-hardened surfaces and materials. This allows the larger parts to be made from lighter materials, further reducing potential unbalance as noted above.

Referring to FIGS. 2-8, the illustrated exemplary embodiment also includes the following parts:

spacer 13
conical washer 14
washers 15, 16
threaded washer 18
pin guide 20
handle 21
nylon button 22
removed dowel pin (same as 1)
screws 24
piston 25
cap 26
U-Cup seal 27

Other configurations may be used as well, in different forms of the invention.

Another exemplary embodiment of a vacuum chuck 00' constructed in accordance with the present invention is shown in FIGS. 9-12. The vacuum chuck of FIGS. 9-12 is similar to the vacuum chuck of FIGS. 2-8 but does not include a locating pin and is for use with disks 114 having relatively smaller diameters, where an internal locating pin is impractical to due space constraints. The vacuum chuck of FIGS. 9-12 also uses a vacuum to consistently and quickly secure the disk 114 to a spindle with a known and repeatable clamping force. The disk 114 is secured between an upper disk support surface 205A of a base assembly 210 and a lower disk support surface 205B of a cap assembly 209 of the vacuum chuck.

The base assembly 210 includes a centering bushing 203 having a cylindrical extension defining a cylindrical inner wall 211 extending along a disk pack axis (DPA). The base assembly 200A also includes a cylindrical space 213 which is disposed about the cylindrical extending portion of centering bushing 203, where the uppermost end surface of spacer 213 forms upper support surface 205A. Fluidic coupling is direct between regions X within the lower end of the cylindrical extending portion of centering bushing 3 and port 2004. The base 200A includes a threaded hollow mounting screw 212 extending therefrom, and adapting the base 200A to be threaded into a mating hole of the top surface of a spindle of a spinstand, which is adapted to be rotatably driven about a spin axis (SA) of the spinstand. The threaded interconnection of the base 210 and the spindle thus couple the chuck 00' to the spinstand.

The cap assembly 209 includes an annular cap-shell 226 disposed about a hollow piston 202, and associated support structure 202A, which is coupled to cap-shell 226 by screws 224 (not shown). A handle 207 extends from the top up support structure 202A.

The piston 202 includes a circumferential groove 202B which houses a circumferential seal 227. It is preferred that seal 227 is a U-cup seal, to support function a described more fully below. The seal 227 provides a selectively sealed interface between region X and region Y depending on the pneumatic pressure established in part 204.

Referring to FIG. 10, the base assembly 210 includes a hollow clamping screw 212A extending from base screw 212 and a Bellville washer 212B. An air passage is defined by the clamping screw 212A and port 4 and in use, a vacuum is applied through the air passage to pull the cap assembly 209 against the base assembly 210 to secure the disk 114 between. Piston 202 and U-Cup seal 227 allow a consistent vacuum to be held between the chuck cap 209 and base 210, while also collapsing under positive pressure inside the cap and base assembly, allowing the cap to be removed quickly and without excess wear to seal 227 or walls 211 of base 210. The U-Cup seal 227 and piston 202 are attached to cap 209 in a manner, allowing disassembly of the cap for easy replacement of U-Cup seal 227.

On both previously mentioned embodiments, the cap is readily disengaged by reversing the internal pressure of the chuck from a vacuum to a pressure greater than atmospheric pressure. In doing so, the cap self-ejects from the spindle, thus releasing the disk 114 and allowing the operator to remove the cap without applying force to overcome seal friction, decreasing disk removal time and effort.

Figure 13:
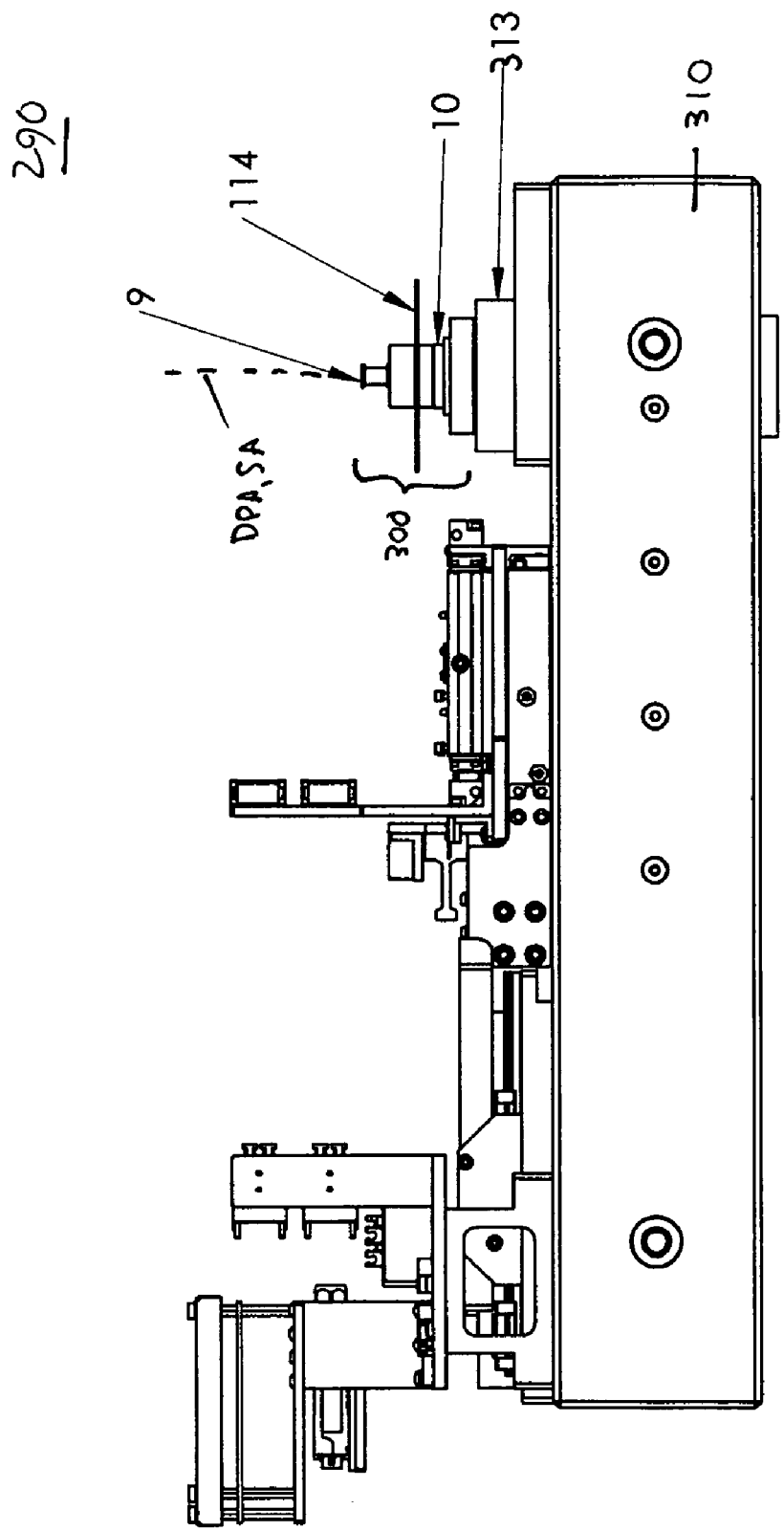
FIG. 13 is a side elevation view of an exemplary spinstand of the invention, having a vacuum chuck and disk mounted to a spindle of the spinstand.
Figure 14:
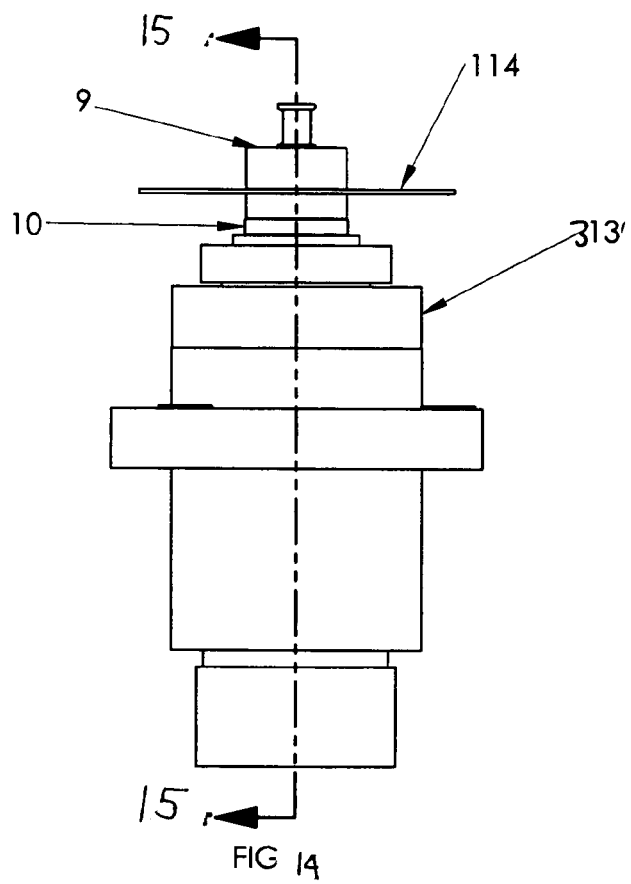
FIG. 14 is a side elevation view of the vacuum chuck of FIG. 13 affixed to a spindle of the spinstand of FIG. 13.
Figure 15:
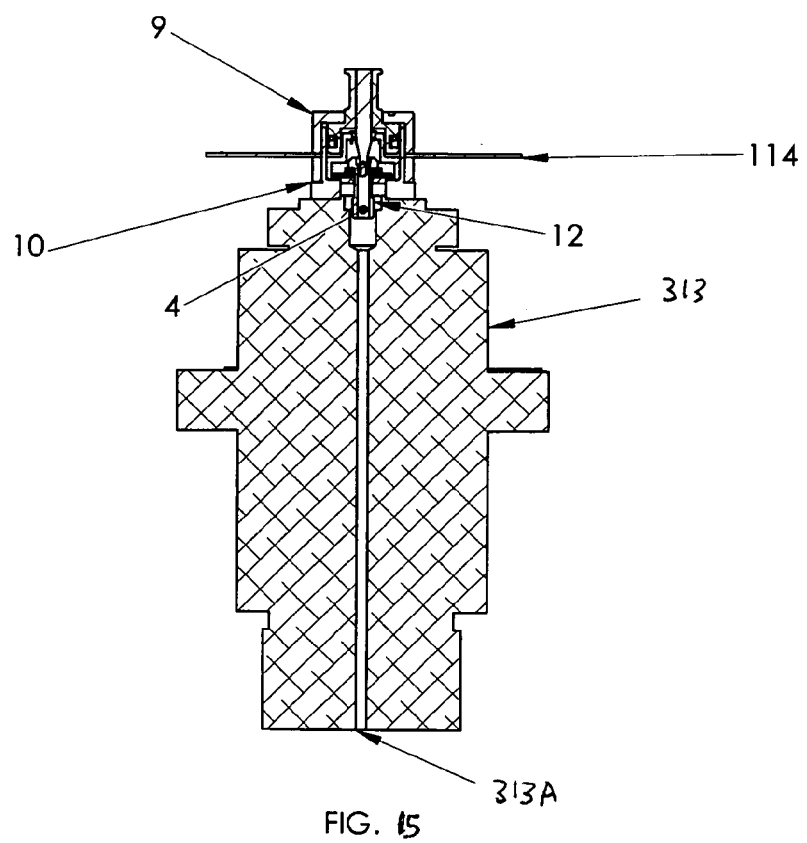
FIG. 15 is a sectional view of the vacuum chuck and spindle taken along line 15-16 of FIG. 13.

FIGS. 13-15 show an exemplary spinstand 290 embodying the invention which includes a base 310, and a spindle 313 and a vacuum chuck 300, as well as conventional components of a spinstand. In those figures, the vacuum chuck 300 is of the type shown in FIGS. 3-8, but the chuck 300 may alternatively be of the type shown in FIGS. 9-12, or other forms of the inventive chuck.

Referring to FIG. 13-15, the vacuum chuck base 10 is fixed to a common spindle 313 by externally threaded bushing clamp screw 12 and a mating female threaded hole in the spindle. Vacuum is applied from the spindle air passage 313A through air passage 4 in screw 12, though it is understood that vacuum may be applied by other means, for example, if the spindle does not have an internal air passage. The resulting clamping force is a product of the vacuum pressure applied and the internal cross section area of chuck base 10.

Figure 2:
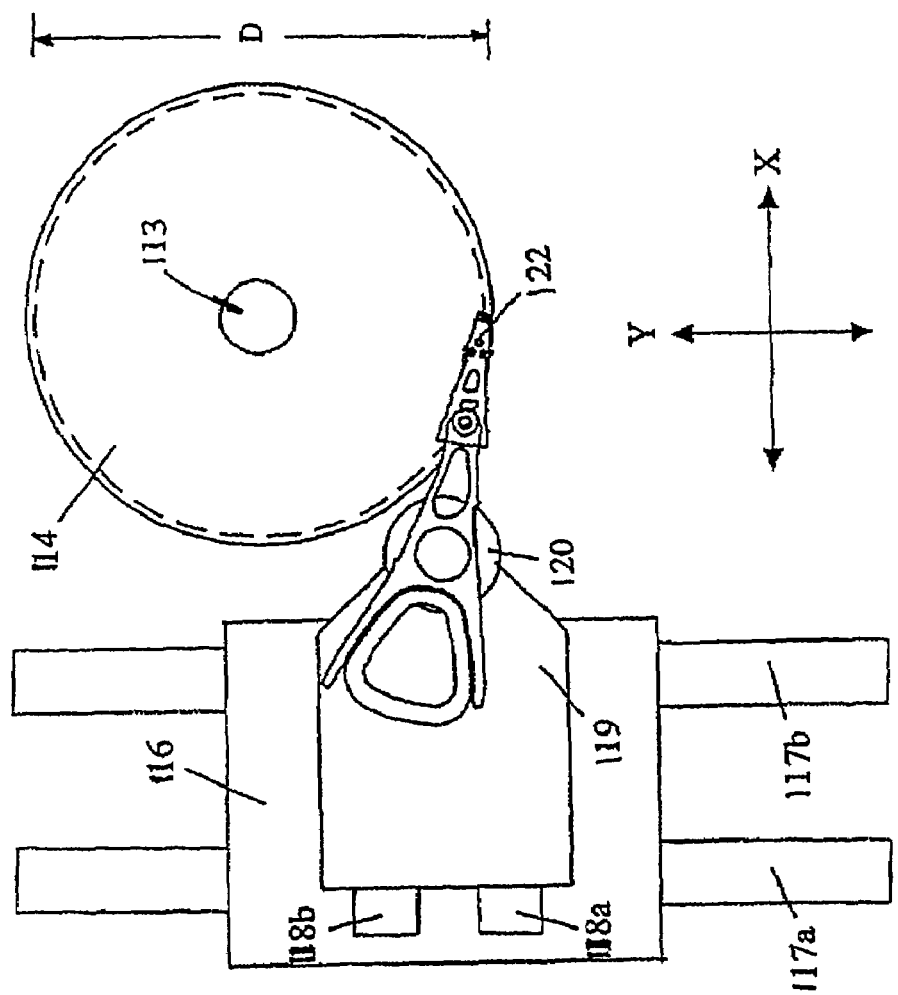
FIG. 2 is a schematic top view of the prior art spinstand of FIG. 1.
Figure 3:
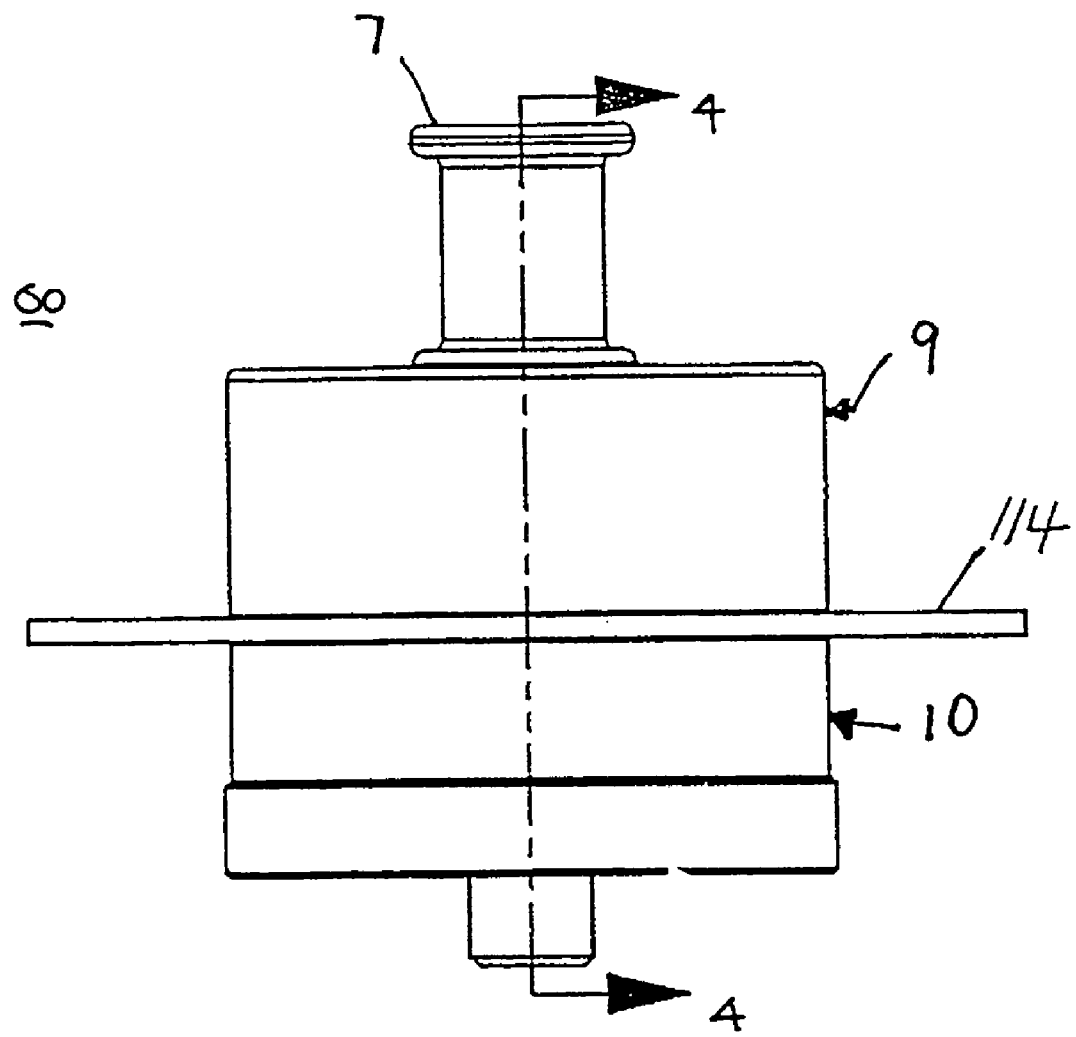
FIG. 3 is a side elevation view of an exemplary embodiment of a vacuum chuck constructed in accordance with the present disclosure, shown holding a disk.

The chucks 00 and 00', as well as variant structures may be used with "bottom mounted" configurations of the type shown in FIGS. 13-15, or "top-mounted" configurations of the type shown in FIGS. 1-2. In such configurations, the invention is embodies by the spinstand and the vacuum chuck in combination.

In operation testing a magnetic disk 114 (or a disk pack with multiple disks), the disk is placed on the flat surface SA of the base. The cap 9 is placed over the disk 114, with pin 1 being inserted into the locating hole 6. Vacuum is then applied to the base through the hole in screw 4, pulling the cap down on the disk with a force equal to the vacuum pressure times the inside area determined by the outer diameter of the seal 27. When the testing cycle is complete, the cap is removed by applying positive pressure to the hole in screw 4 instead of vacuum, forcing the cap off of the disc.

The vacuum chuck clamping mechanism of the invention provides a clamping force without the use of a mechanical fastener, enabling faster disk installation and removal times during testing without sacrificing disk stability.

While this disclosure has been particularly shown and described with references to exemplary embodiments thereof, it will be understood by those skilled in the art that various changes in form and details may be made therein without departing from the spirit and scope of the disclosure.

What is claimed is:

1. A spinstand for rotatably supporting a disk pack, said disk pack including one or more annular magnetic disks concentrically arranged in a stack along a disk pack axis (DPA), said disks being mutually spaced apart in the direction of said DPA, comprising:

A. a base unit,

B. a spindle coupled to said base unit and having an output drive element adjacent to a disk pack region and having an associated spindle drive motor and adapted to selective rotate said output drive element about a spindle axis, said spindle axis extending through said disk pack region, C. a vacuum chuck assembly coupled to said output drive element for removably positioning said disk pack in said disk pack region whereby said DPA is coaxial with said spin axis in response to a selectively applied vacuum, wherein said vacuum chuck assembly includes:

i. a base assembly disposed along a central axis and adapted for coupling to said spindle output drive element and, a. a centering bushing having a cylindrical inner wall having a diameter D and being coaxial with and extending along said central axis and defining a base interior region, b. a vacuum port adapted to fluidically couple an applied vacuum to said base interior region, c. a lower disk support surface extending transverse to said central axis and adapted for engagement with one end of said disk pack, ii. a cap assembly disposed along a cap axis and including:

a. an inverted cup-shaped element extending along a said axis and disposable opposite said base assembly with said cap axis being coaxial with said central axis, b. a piston extending from said cup-shaped element along said cap axis, said piston having a cylindrical lateral surface having a diameter less than D, and wherein said lateral surface includes a circumferential groove extending thereabout transverse to said cap axis,
c. a circular seal disposed in said groove of said piston, defining a cap interior region between said seal and said cup-shaped element, and
d. an upper disk support surface extending transverse to said cap axis and adapted for engagement with one end of said disk pack, wherein with a disk pack positioned on said lower disk support surface with said DPA being coaxial with said central axis, and with said cap assembly positioned opposite said base assembly with said cap axis coaxial with said central axis, a vacuum applied to said vacuum port causes said circular seal to pneumatically seal said base interior region with respect to said cap interior region whereby said vacuum causes a pressure differential across said piston thereby biasing said piston toward said base assembly, thereby compressively supporting said disk pack between said lower disk support surface and said upper disk support surface.

2. A spinstand according to claim 1 wherein said upper disk support surface and said lower disk support surface are relatively compliant compared to said disk pack.

3. A spinstand according to claim 1 wherein said cap assembly includes a central pin extending along said cap axis from said cup-shaped element to a distal tip thereof, and wherein said base assembly includes a locating element defining a locating hole, said locating hole being coaxial with and transverse to said central axis and being adapted to receive said distal tip of said centering pin.

4. A spinstand according to claim 3 wherein said central pin has a soft distal tip.

5. A spinstand according to claim 1 wherein said circular seal is a U-cup seal.

6. A spinstand according to claim 1 wherein said base unit is adapted to spindle is positioned with said output drive element facing away from said base unit.

7. A spinstand according to claim 1 further including a support structure for supporting said spindle whereby said output drive element faces said base unit, and said disk pack region is between said output drive element and said base unit.

8. A spinstand according to claim 1, wherein an outer shell of said cap is made of plastic.

9. A spinstand according to claim 8 wherein said plastic is 30% carbon filled PEEK.

10. A spinstand according to claim 1 wherein said disk pack includes only one disk.

11. A spinstand according to claim 1 wherein said disk pack includes a plurality of disks.

12. A vacuum chuck for selectively coupling a disk pack to a spindle of a spinstand, said spinstand having a spin axis (SA), comprising,
i. a base assembly disposed along a central axis and adapted for coupling to said spindle output drive element and,
  a. a centering bushing having a cylindrical inner wall having a diameter D and being coaxial with and extending along said central axis and defining a base interior region,
  b. a vacuum port adapted to fluidically couple an applied vacuum to said base interior region,
  c. a lower disk support surface extending transverse to said central axis and adapted for engagement with one end of said disk pack,
ii. a cap assembly disposed along a cap axis and including:
  a. an inverted cup-shaped element extending along a said axis and disposable opposite said base assembly with said cap axis being coaxial with said central axis,
  b. a piston extending from said cup-shaped element along said cap axis, said piston having a cylindrical lateral surface having a diameter less than D, and wherein said lateral surface includes a circumferential groove extending thereabout transverse to said cap axis,
  c. a circular seal disposed in said groove of said piston, defining a cap interior region between said seal and said cup-shaped element, and
  d. an upper disk support surface extending transverse to said cap axis and adapted for engagement with one end of said disk pack, wherein with a disk pack positioned on said lower disk support surface with said DPA being coaxial with said central axis, and with said cap assembly positioned opposite said base assembly with said cap axis coaxial with said central axis, a vacuum applied to said vacuum port causes said circular seal to pneumatically seal said base interior region with respect to said cap interior region whereby said vacuum causes a pressure differential across said piston thereby biasing said piston toward said base assembly, thereby compressively supporting said disk pack between said lower disk support surface and said upper disk support surface.

13. A vacuum chuck according to claim 12 wherein said upper disk support surface and said lower disk support surface are relatively compliant compared to said disk pack.

14. A vacuum chuck according to claim 12 wherein said cap assembly includes a central pin extending along said cap axis from said cup-shaped element to a distal tip thereof, and
  wherein said base assembly includes a locating element defining a locating hole, said locating hole being coaxial with and transverse to said central axis and being adapted to receive said distal tip of said centering pin.

15. A vacuum chuck according to claim 14 wherein said central pin has a soft distal tip.

16. A vacuum chuck according to claim 12 wherein said circular seal is a U-cup seal.

17. A vacuum chuck according to claim 12, wherein an outer shell of said cap is made of plastic.

18. A vacuum chuck according to claim 17 wherein said plastic is 30% carbon filled PEEK.

19. A spinstand according to claim 12 wherein said disk pack includes only one disk.

20. A spinstand according to claim 12 wherein said disk pack includes a plurality of disks.

* * * * *